United States Patent [19]

Kubo

[11] 4,071,980
[45] Feb. 7, 1978

[54] HONING MACHINE PROVIDED WITH A POWER CONTROLLER

[75] Inventor: Yoshiki Kubo, Hiroshima, Japan

[73] Assignee: Toyo Kogyo Co., Ltd., Japan

[21] Appl. No.: 773,117

[22] Filed: Feb. 28, 1977

[30] Foreign Application Priority Data

Mar. 1, 1976 Japan .................................. 51-22449

[51] Int. Cl.² ............................................. B24B 49/18
[52] U.S. Cl. ................................ 51/165.87; 51/165.92
[58] Field of Search ........... 51/165.87, 165.88, 165.92, 51/165.77, 165 R

[56] References Cited

U.S. PATENT DOCUMENTS

| 3,736,704 | 6/1973 | Robillard et al. | 51/165.87 |
| 3,913,277 | 10/1975 | Hahn et al. | 51/165.92 |

FOREIGN PATENT DOCUMENTS

| 2,044,083 | 3/1972 | Germany | 51/165.92 |
| 50,072 | 1974 | Japan | 51/165.87 |

Primary Examiner—Harold D. Whitehead
Attorney, Agent, or Firm—Wenderoth, Lind & Ponack

[57] ABSTRACT

The present disclosure relates to a honing machine in which there is incorporated a power control circuit for controlling the power to be supplied to a cutting in device so as to stabilize the grinding force to be consumed in a grinding wheel. The power control circuit provides a constant power to the cutting in device while the grinding wheel is a certain size, while on the other hand, when the diameter of the grinding wheel decreases due to dressing, a correcting circuit provided in the power control circuit produces a correcting signal with respect to a rate of change of the grinding wheel diameter for correcting the power to be supplied to the cutting in device, thereby stabilizing the grinding force and preventing an undesirable increase in the grinding force.

14 Claims, 5 Drawing Figures

HONING MACHINE PROVIDED WITH A POWER CONTROLLER

The present invention relates to a honing machine in which a power control circuit is incorporated for correcting variations grinding force of a grinding wheel caused by a reduction of the diameter of the grinding wheel through dressing, and more particularly, to the power control circuit which is designed to correct the grinding force with respect to a calculated value of the rate of change of diameter of the grinding wheel with reference to an initial diameter of the grinding wheel and a degree of change of the grinding wheel diameter.

The honing machine with which the present invention is concerned generally has a grinding wheel fixedly mounted on a shaft connected to a grinding wheel driving motor. The driving motor is so arranged as to reciprocate by means of a suitable hydraulic means in a direction parallel to the axis of the shaft so that the grinding wheel may change its position between a forwarded position and retreated position. Provided at a position ahead of the grinding wheel is a work piece, for example, a ring shaped metal piece which is fixedly mounted on a work head while the work head itself rotates to turn the ring shaped metal piece about the center thereof. In addition to the rotation of the work piece, the work head is so arranged as to move in a direction perpendicular to the axis of the shaft of the driving motor, so as to move the work piece in the direction perpendicular to the axis of the shaft. Provided approximately between the work head and the grinding wheel placed at the retreated position is a dresser unit for dressing or sharpening the peripheral surface of the grinding wheel. As the grinding wheel advances from the retreated position towards the forwarded position, the peripheral surface of the grinding wheel is sharpened by the dresser unit which slidingly passes the surface of the grinding wheel. Then, the grinding wheel is further advanced to the forwarded position where the grinding wheel is surrounded by the ring shaped work piece. Thereafter, the work head is shifted aside to have the inner surface of the work piece contact the grinding wheel at a predetermined pressure, while the work piece is rotated about its center. Accordingly, by the predetermined pressure, the grinding wheel cuts in, i.e., grinds or polishes the inner surface of the work piece.

After the cutting in operation is continued for some times, it is necessary to resharpen the surface of the grinding wheel, and again to carry the cutting in operation. Such resharpening operation, however, abrades the grinding wheel to reduce the diameter thereof, so that the cutting in force or grinding force may disadvantageously increase with respect to the degree of abrasion, i.e., the degree of reduction of the diameter of the grinding wheel. Accordingly, in order to eliminate such disadvantageous increase of the grinding force, there is provided in the honing machine a power control circuit for controlling the grinding force.

In general, various types of control system is incorporated in a honing machine for controlling the output power of a driving motor for the grinding wheel for stabilizing the grinding force. One of such type of control system is set forth in Japanese Utility model resistration No. 896147, in which the control system is so designed as to keep the grinding wheel driving motor at a constant value, so that there has been such a disadvantage that the grinding force would increase as the diameter of the grinding wheel decreases. Accordingly, when using the conventional type of honing machine, the operator provisionally regards the grinding force as at its maximum, that is, when the diameter of the grinding wheel is smallest, during all round operation of the honing machine. Therefore, the grinding force, before the grinding wheel being dressed to such small size, would be below the assumed grinding force, thus the honing machine is not operated with efficiency.

According to another type of conventional honing machine which is set forth in Japanese Patent application No. 50072/1972 being laid open to public inspection under a Ser. No. 15079/1974, the grinding force is corrected with respect to the degree of change of the diameter of the grinding wheel. However, in this type of honing machine, the correction of the grinding force depends only on the degree of change of the grinding wheel diameter and does not depends on the diameter itself of the grinding wheel, so that the amount of correction would not change with respect to grinding wheels in different diameter. Accordingly, there has been such a disadvantage that the precise correction is not ensured.

Generally, the grinding force, that is a resistance force Ft established between the grinding wheel and a work piece in a tangent direction of the grinding wheel is represented by the equation as follows;

$$Et = \frac{K}{\omega D} \cdot P = \frac{K}{\omega D_o} \cdot \frac{P}{\frac{D_o - \Delta D}{D_o}} \quad (1)$$

wherein P is a consumed power in the grinding wheel driving motor, $\omega$ is an angular velocity of the grinding wheel, D is a diameter of the grinding wheel, D is an initial diameter of the grinding wheel, $\Delta D$ is the amount of change of the grinding wheel diameter and K is constant. As is apparent from the equation (1), the diameter D is in reciprocal relation to the resistance force Ft so that the rate of change of the grinding wheel diameter $(D_o - \Delta D)/D_o$ is also in reciprocal relation to the resistance force Ft. Accordingly, the correction of only the $\Delta D$ would not properly correct the resistance force.

Therefore, a primary object of the present invention is to present an improved type of power control circuit for the honing machine, in which a correcting signal is produced with reference to the amount of change D of the grinding wheel diameter and also to the grinding wheel diameter D.

Another object of the present invention is to present a power control circuit of above described type which produces a proper correcting signal with respect to various sizes of the grinding wheel.

Yet another object of the present invention is to present a power control circuit of above described type which controls the resistance force Ft to maintain in a desirable amount thereof or to change in a desirable rate for efficient operation of the honing machine.

A further object of the present invention is to present a power control circuit of above described type which is simple in the structure and comparatively low in manufacturing cost.

The honing machine of the present invention comprises a grinding unit including a grinding wheel for cutting in a work piece, a driving motor for rotating the grinding wheel, a power establishing means for establishing a power necessary to perform the grinding operation, power detecting means for detecting power consumed in the grinding unit and for producing a voltage signal indicative of the detected power, a comparator for comparing established power with the voltage signal, and correcting circuit means for correcting the power to be established in the establishing means.

The correction circuit means comprises a grinding wheel initial diameter function circuit for producing a signal indicative of initial diameter of the grinding wheel, dressing detector for detecting the amount of dressing effected on the peripheral surface of the grinding wheel and for producing a signal indicative of the detected amount which is substantially equal to the degree of diameter decrease of the grinding wheel and a grinding wheel function circuit. A correcting signal produced from the correction circuit means is provided to the power establishing means for correcting the power to be established therein.

According to the honing machine of the present invention, the established power to be supplied to the cutting in unit is compared with the consumed power in the grinding unit for stabilizing the operation of grinding operation, while on the other hand, when the diameter of the grinding wheel is reduced and grinding force is increased, the established power is varied to a smaller amount with respect to a correcting signal received from the correcting circuit means. Since the correcting signal affects on the power establishing means to change the power to be established therein with respect to the rate of change of the grinding wheel diameter, the consumed power in the grinding unit can be maintained at a predetermined value or can be changed at a predetermined rate.

The correcting circuit means comprises a first operational amplifier which receives a signed from the dressing detector to input thereof and provides an output signal therefrom to the initial diameter function circuit and a second operational amplifier which receives a signal from the initial diameter function circuit to input thereof and provides an output signal therefrom to the input of the first operational amplifier, whereby the correcting signal is produced from the output of the first operational amplifier.

These and other objects and features of the present invention will become apparent from the following description taken in conjunction with several preferred form of embodiments thereof shown in the accompanying drawings, in which;

Before the description of the present invention proceeds, it is to be noted that like parts are designated by like reference numerals throughout the several views of the accompanying drawings.

Figure 1:
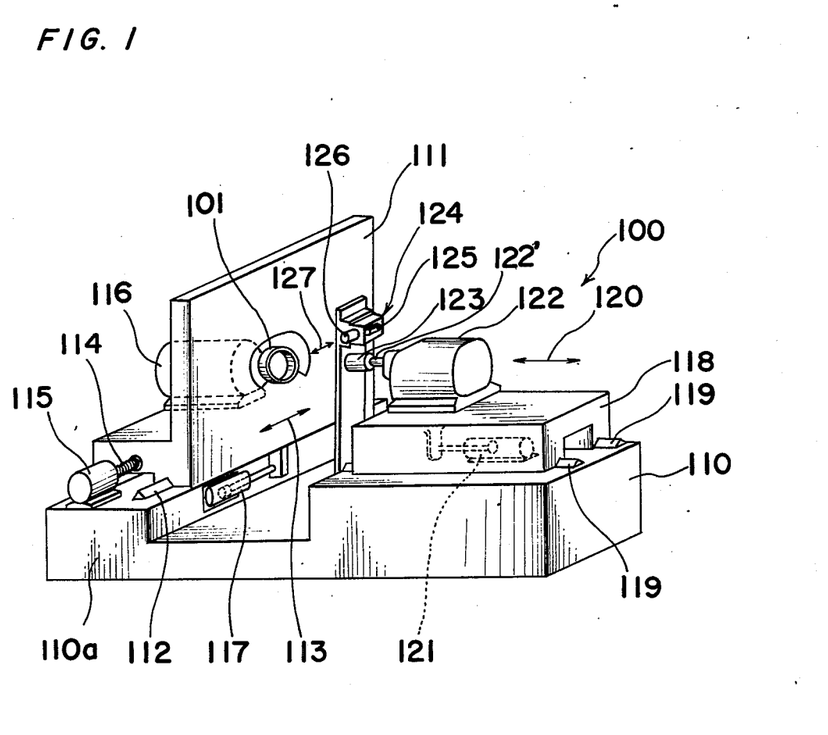
FIG. 1 is a schematic perspective view of a honing machine of the present invention.

Referring first to the FIG. 1, there is shown a honing machine 100 in which there is incorporated a power control circuit of the present invention. The honing machine 100 comprises a base block 110 on which there is provided at the left side thereof an L-shaped upright supporting member 111 for supporting a work piece 101 positioned approximately at the central portion thereof. Since the supporting member 111 is slidingly mounted on a track 112 fixedly formed on the base block 110 and extended between a front face 110a and back face of the base block 110, the supporting member 111 shifts back and forth along the track 112 in a direction of an arrow 113 by a rotation of a threaded shaft 114 coupled to a motor 115 and screwed into a corresponding threaded opening formed in the member. The shifted distance of the supporting member 111 is detected by a potentiometer or any other known element incorporated in a housing 117. The ring shaped work piece 101 is detachably mounted on a work-head 116 installed on the supporting member 111 for rotating the work piece 101 by a rotating spindle (not shown) or by any other known rotating means.

Provided at the right side of the upright supporting member 111 is a slidable deck 118 which is slidingly mounted on a track 119 for moving the deck 118 in a direction of an arrow 120, directed perpendicularly to the arrow 113, by a suitable hydraulically driven cylinder 121 provided in the base block 110. Fixedly mounted on the deck 118 is a grinding wheel driving motor 122 on a shaft 122' of which there is provided a grinding wheel 123. Provided approximately between the work piece 101 and the grinding wheel 123 is a dressing unit 124 fixedly supported on the base block 110. The dressing unit 124 has a dresser 126 whose tip edge is provided with an extremely hard material such as diamond. The dresser 126 is coupled to a suitable shifting means for the movement thereof in a direction of an arrow 127 which is in parallel relation to the arrow 113 and, if extended, would come across the axis of the shaft 122'. The degree of the movement of the dresser 126 is detected by a potentiometer 125 coupled to the dresser 126.

Before starting the operation of the honing machine 100 as described above, the grinding wheel 123 of a suitable size is fixedly mounted on the shaft 122' of the grinding wheel driving motor 122. Thereafter, the deck 118 is moved halfway towards the work piece 101 while the grinding wheel 123 is rotated at a comparatively high speed. At such a position, the dresser 126 is extended out of the dressing unit 124 until the tip edge thereof touches the peripheral surface of the grinding wheel 123 for removing the grains and sharpening the peripheral surface of the grinding wheel 123. The distance through which the dresser 126 is projected out is measured by the potentiometer 125 which would also indicate the diameter of the grinding wheel 123. After having dressed the grinding wheel 123, the deck 118 is further shifted towards the work piece 123 until the grinding wheel 123 is positioned adjacent to the inner surface of the ring shaped work piece 101. Then, the motor 115 is driven to slidingly shift the L-shaped upright supporting member 111 together with the work piece 123 until the inner surface of the work piece 101 is urged to the peripheral surface of the grinding wheel 123 at a predetermined force controlled by the power control circuit coupled to the motor 115. At the same time, the work piece 101 itself is rotated by the work head 116. This, cutting in, that is grinding or polishing the inner surface of the work piece 101 is effected by the resistance force established between the work piece 101 and the grinding wheel 123. After having ground the work piece 101 for some time, it is necessary to resharpen the peripheral surface of the grinding wheel. For this purpose, the grinding wheel 123 together with the deck 118 is withdrawn from the work piece 101 and is again dressed by the dresser 126. Since the dressing operation reduces the diameter of the grinding wheel 123, the resistance force, if processing takes place under the same condition, would increase as the diameter of the grinding wheel 123 decreases. In order to avoid such increase of the resistance force, the power control circuit is provided for controlling the movements of the motor 115 forming a cutting in unit and the motor 122 forming a grinding unit.

Figure 2:
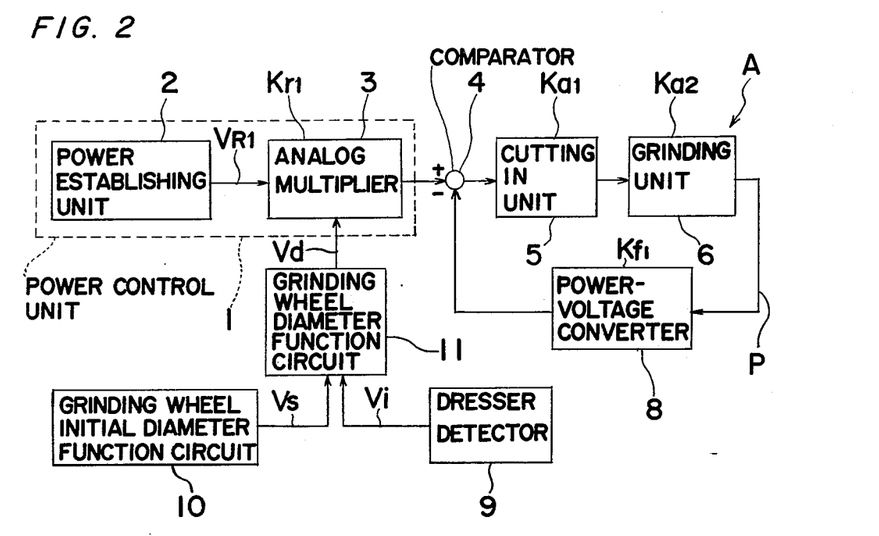
FIG. 2 is a block diagram of a power control circuit of the present invention.

Referring to FIG. 2, there is shown a block diagram of a power control circuit A according to one embodiment of the present invention. The power control circuit A is normally incorporated in a honing machine 100 for controlling the power P obtained from the grinding wheel 123. The power control circuit A comprises a power control unit 1 including a grinding power establishing unit 2 and an analog multiplier 3 connected to the power establishing unit 2 in series relation thereto. The power establishing unit 2 is provided for establishing a predetermined power signal, for example, in a voltage of $VR_1$, necessary to run a grinding wheel driving motor 122, while the analog multiplier 3 is provided for multiplying said predetermined power by a term of $Kr_1$ which serves as a variable coefficient, as is described more in detail later. The analog multiplier 3 is further connected to a cutting in unit 5 through a comparator 4, and the cutting in unit 5 is further connected to a grinding unit 6.

It is to be noted that the cutting in unit 5 is provided for controlling, upon receipt of a signal from the comparator 4, the number of turns of the motor 115, thus substantially controlling the pressing force of the grinding wheel 123 against the inner surface of the work piece 101, while on the other hand, the grinding unit 6 is provided for controlling the grinding force of the grinding wheel 123 by one of variable factors such as electric power, torque of the shaft, revolution number, voltage, etc. of the driving motor 122.

Upon receipt of the signal from the power control unit 1 through the comparator 4, the cutting in unit 5 controls a rotating force, for example, number of turns of the motor 115 provided for displacing the work piece with respect to the grinding wheel, whereby the frictional force or the resistance force produced between the grinding wheel 123 and the work piece 101 changes, and thus changing the grinding force produced from the shaft 122' of the grinding wheel 123 of the grinding unit 6. The change of such grinding force is detected in the grinding unit 6 which simultaneously produces a signal P indicative of the momentary power consumed for grinding the work piece 101. The reference numeral 8 designates a power-voltage converter which changes the power signal P into voltage signal with a converting coefficient of $Kf_1$ and feeds the converted signal produced therefrom back to the comparator 4. The comparator 4 compares the converted signal with the signal from the power control unit 1 and thus controls the grinding power to be produced with respect to the cutting in unit 5 in a constant power. Connected to the analog multiplier 3 is a grinding wheel diameter function circuit 11 which produces a correcting signal $Vd$ with reference to a signal from a dresser detector 9 and a signal from a grinding wheel initial diameter function circuit 10.

The dresser detector 9 is provided for detecting the diameter change of the grinding wheel by detection of a change of the amount of the dressing and is coupled to, for example, a potentiometer 125 provided in a dressing unit 124. It is to be noted that the output signal Vi from the dresser detector 9 increases as the change of the diameter of the grinding wheel increases through the process of dressing.

The grinding wheel initial diameter function circuit 10 produces a signal Vs indicative of an initial diameter of the grinding wheel.

The grinding wheel diameter function circuit 11 calculates, upon receipt of signals Vi and Vs from the dresser detector 9 and the grinding wheel initial diameter function circuit 10, respectively, the rate of change of the grinding wheel diameter $(Do-\Delta D)/Do$ and produces the correcting signal $Vd$ with reference to the calculated value of $(Do-\Delta D)/Do$, in which Do is an initial size of the diameter of the grinding wheel 123 and $\Delta D$ is the amount of change in the diameter of the grinding wheel 123. The correcting signal $Vd$ applied to the analog multiplier 3 causes the variable coefficient $Kr_1$ to change its value. As the rate $(Do-\Delta D)/Do$ changes with respect to the process of dressing, the correcting signal $Vd$ varies in such a manner that the decrease of the diameter of the grinding wheel decreases the variable coefficient $Kr_1$, thus preventing the grinding force to increase undesirably.

When the various factors are defined as follows;
P — consuming power of the grinding wheel driving motor;
ω — angular velocity of the grinding wheel;
D — diameter of the grinding wheel;
Ft — resistance force in a tangential direction of the grinding wheel with respect to the work piece;
$Ka_1$ — output coefficient for the cutting in unit 5;
$Ka_2$ — output coefficient for the grinding unit 6;
$Vd$ — correcting signal;
$KR_{10}$ — initial value for the term $Kr_1$; and
$Vd_0$ — initial value for the correcting signal $Vd$;
the resistance force Ft can be represented by following equation (2).

$$Ft = \frac{2}{\omega D} \cdot P = \frac{2}{\omega D} \cdot \frac{Ka_1 \cdot Ka_2}{1 + Ka_1 \cdot Ka_2 \cdot Kf_1} \cdot Kr_1 \cdot VR_1$$

$$= \frac{2}{\omega D} \cdot \frac{VR_1}{Kf_1} \cdot Kr_1 = \frac{2}{\omega D} \cdot \frac{KR_{10} \cdot VR_1}{Kf_1 \cdot Vd_0} \cdot Vd$$

$$= \frac{2}{\omega Do} \cdot \frac{KR_{10} \cdot VR_1}{Kf_1 \cdot Vd_0} \cdot \frac{Vd}{\frac{Do - \Delta D}{Do}} \quad (2)$$

As is apparent from the equation (2), the resistance force Ft will be in reciprocal relation to the rate of change of the grinding wheel diameter $(Do-\Delta D)/Do$ and in proportional relation to the variable coefficient $Kr_1$, provided that the predetermined voltage $VR_1$ and the converting coefficient $Kf_1$ are constant.

Accordingly, in order to have the resistance force Ft keep a predetermined value regardless of the change of the diameter of the grinding wheel $(Do-\Delta D)/Do$, or vary proportionally with respect to the change in the rate of change of the diameter of the grinding wheel, it is necessary to find a function applicable to the correcting signal $Vd$ having parameter of change of the diameter of the grinding wheel $(Do-\Delta D)Do$.

Figure 3:
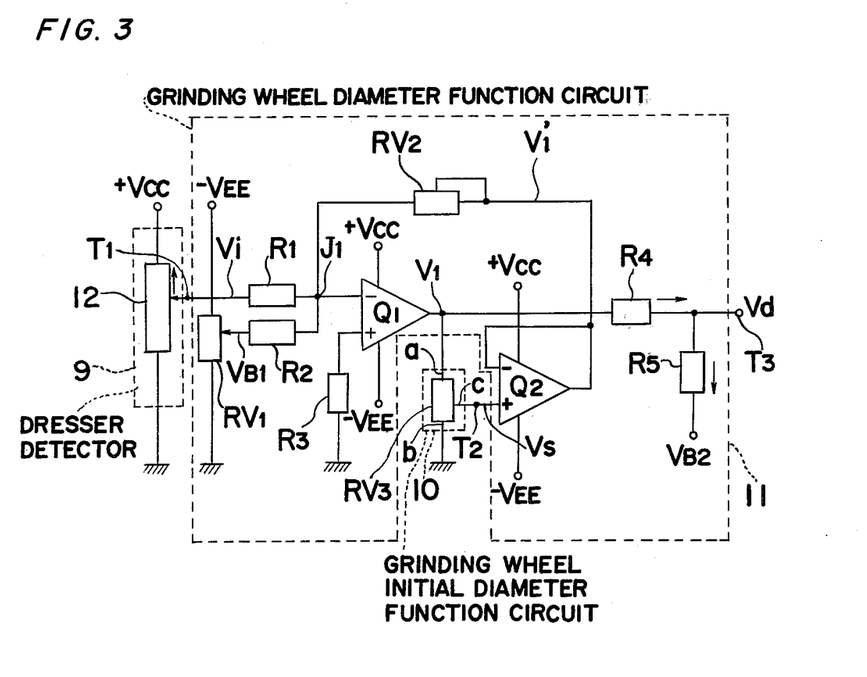
FIG. 3 is a wiring diagram of the grinding wheel diameter function circuit showing a detail connection thereof.

Referring now to FIG. 3, there is shown a detail connection of the grinding wheel diameter function circuit 11 in which one input $T_1$ is connected to the dresser detector 9. The dresser detector 9 has a potentiometer 12 which is supplied with a constant voltage Vcc while the sliding arm thereof displaces its position with respect to the amount of dressing effected on the grinding wheel, in such a manner that the voltage level Vi produced at the sliding arm increases as the diameter of the grinding wheel becomes small through the effect of dressing.

The grinding wheel diameter function circuit 11 comprises a first operational amplifier $Q_1$ having an inverting input thereof connected to the sliding arm of the potentiometer 12 through a resistor $R_1$ and also to a variable resistor $RV_1$ through a resistor $R_2$ which is provided for the zero-adjustment. One end of the resistor $RV_1$ is connected to the voltage source of $-V_{EE}$ while the other end thereof is connected to the ground. A non-inverting input of the operational amplifier $Q_1$ is connected to the ground through a biasing resistor $R_3$. An output of the operational amplifier $Q_1$, where the fluctuating voltage $V_1$ is produced, is connected to the output terminal $T_3$ of the grinding wheel diameter function circuit 11 through a resistor $R_4$, and the correcting signal Vd is produced from the output terminal $T_3$. Also connected to the resistor $R_4$ is a resistor $R_5$ which is provided with the biasing voltage $V_{B2}$ for the correcting signal Vd. A second operational amplifier $Q_2$ has its inverting input connected to the output thereof, while the non-inverting input thereof is connected to a sliding arm, i.e., to a terminal c of a potentiometer $RV_3$ which is forming the grinding wheel initial diameter function circuit 10. Applied across the potentiometer $RV_3$, i.e., between terminals a and b is the fluctuating voltage $V_1$ produced from the output of the first operational amplifier $Q_1$. As is apparent to those skilled in the art, the voltage produced at the terminal c is proportional to the divided ratio of $K_3$ defined by Rbc/Rab. A fluctuating voltage signal $V'_1$ produced from the output of the operational amplifier $Q_2$ is fed to the inverting input of the operational amplifier $Q_1$ through a variable resistor $RV_2$ serving as a correcting rate establishing element. It is needless to say that the operational amplifiers $Q_1$ and $Q_2$ are supplied with a voltage of $+Vcc$ at their positive power supply terminal and a voltage of $-V_{EE}$ at their negative power supply terminal.

In the grinding wheel diameter function circuit 11 constructed as described above, the second operational amplifier $Q_2$ serves as a buffer amplifier, so that the voltage $V'_1$ produced from the output of the second operational amplifier $Q_2$ is equal to the voltage $K_3 \cdot V_1$ supplied to the non-inverting input of the second operational amplifier $Q_2$. By disregarding the current, which is almost zero, flowing through the inverting input of the operational amplifier $Q_1$, the current flowing through a junction $J_1$ can be expressed as follows;

$$\frac{Vi}{R_1} + \frac{VB_1}{R_2} + \frac{K_3 V_1}{RV_2} = 0 \qquad (3)$$

Therefore, by rearranging the equation (3), the output voltage $V_1$ of the first operational amplifier $Q_1$ can be expressed as follows;

$$V_1 = -\frac{RV_2}{K_3} \cdot \left(\frac{Vi}{R_1} + \frac{VB_1}{R_2}\right) \qquad (4)$$

By disregarding the current flowing through the terminal $T_3$ of the grinding wheel diameter function circuit 11, the current flowing through the resistor $R_4$ is approximately equal to the current flowing through the resistor $R_5$, thus obtaining an equation as follows;

$$\frac{V_1 - Vd}{R_4} \approx \frac{Vd - VB_2}{R_5} \qquad (5)$$

Accordingly, the correcting signal Vd can be expressed as follows;

$$Vd = \frac{\frac{V_1}{R_4} + \frac{VB_2}{R_5}}{\frac{1}{R_4} + \frac{1}{R_5}} = \frac{R_4}{R_4 + R_5} \cdot VB_2 + \frac{R_5}{R_4 + R_5} \cdot V_1$$

$$= \frac{R_4}{R_4 + R_5} \cdot VB_2 - \frac{R_5}{R_4 + R_5} \cdot$$

$$\left(\frac{RV_2}{K_3 R_1} \cdot Vi + \frac{RV_2}{K_3 R_2} \cdot VB_1\right) \qquad (6)$$

After having mounted the grinding wheel fixedly on the shaft and having dressed the surface of the grinding wheel for the first time, the honing machine is in its initial state and ready for operation. At such initial state, the sliding arm of the potentiometer 12 is slided to its starting position where the voltage produced therefrom is adjusted to a value of $Vi_0$. After having carried out the operations a certain number of times, the sliding arm slides to produce higher voltage as the grinding wheel is further dressed. Accordingly, by defining the varied amount of the voltage Vi as vi, the produced voltage Vi can be expressed as $Vi = Vi_0 + vi$. Furthermore, by adjusting the resistor $RV_1$ in such a value as to have the voltage $V_1$ equal to zero when the voltage Vi is equal to $Vi_0$, the equation 4 can be simplified to $$VB_1 = -\frac{R_2}{R_1} \cdot Vi_0,$$

and thus the equation 6 can be changed to $$Vd = \frac{R_4}{R_4 + R_5} \cdot VB_2 - \frac{R_5}{R_4 + R_5} \cdot \frac{RV_2}{K_3 \cdot R_1} \cdot vi \qquad (7)$$

By substituting the voltage Vi for Ki(Do-D), the equation (7) can be expressed as follows;

$$Vd = \frac{R_4}{R_4 + R_5} \cdot VB_2 - \frac{R_5}{R_4 + R_5} \cdot \frac{RV_2}{K_3 R_1} \cdot Ki(Do - D)$$

$$= \frac{R_4}{R_4 + R_5} \cdot VB_2 - \frac{R_5}{R_4 + R_5} \cdot$$

$$\frac{RV_2}{R_1} \cdot \frac{Do}{K_3} \cdot Ki(1 - \frac{D}{Do}) \qquad (8)$$

By difining the voltage Vd as $Vd_0$, when the grinding wheel diameter D is at its initial value Do, then the equation (8) can be represented as follows;

$$Vd = Vd_0 - Kd(1 - \frac{D}{Do})$$

$$\text{wherein } Kd = \frac{R_5}{R_4 + R_5} \cdot \frac{RV_2}{R_1} \cdot \frac{Do}{K_3} \cdot Ki. \qquad (9)$$

As is apparent from the equation (9), the voltage Vd can be obtained in a linear relation or in proportion relation to the rate of change of the grinding wheel diameter D/Do. Therefore, the resistance force Ft in a tangential direction of the grinding wheel with respect to the work piece can be corrected with respect to the rate of change of the grinding wheel diameter D/Do.

In one case where the factor Kd in the equation (9) is zero, the obtained relation is $Vd = Vd_0$. In this case the resistance force Ft can be expressed as follows;

$$Ft = \frac{2}{\omega Do} \cdot \frac{KR_{10} \cdot VR_1}{Kf_1} \cdot \frac{1}{\frac{Do - \Delta D}{Do}} \quad (2a)$$

Therefore, in this case, where $Kd=0$, the resistance force Ft would increase as the rate of change of the grinding wheel diameter D/Do decreases, as in the conventional type.

In another case where $Kd = Vd_0$, the obtained relation from the equation (9) is $$Vd = Vd_0 \cdot \frac{D}{Do}.$$

Thus, the resistance force Ft can be expressed as follows;

$$Ft = \frac{2}{\omega Do} \cdot \frac{KR_{10} \cdot VR_1}{Kf_1 \cdot Vd_0} \cdot \frac{Vd_0 \cdot \frac{D}{Do}}{\frac{\omega D}{Do}} =$$

$$\frac{2}{Do} \cdot \frac{KR_{10} \cdot VR_1}{Kf_1} \quad (2b)$$

Therefore, in this case, where $Kd=Vd_0$, the resistance force Ft would maintain a predetermined value despite the decrease in the diameter of the grinding wheel.

In a further case where $Kd > Vd_0$, it is possible to have the resistance force Ft to decrease with respect to the decrease of the diameter of the grinding wheel.

As is understood from the foregoing description, the power control circuit of the present invention is available for controlling the resistance force Ft in an increasing or decreasing value with respect to the change in the rate of change of the grinding wheel diameter D/Do, or in a constant value irrespective to the change in the rate of change of the grinding wheel diameter D/Do.

When it is necessary to change the diameter of the grinding wheel, for example through the replacement of the grinding wheel with another grinding wheel having different diameter, a ratio α defind by a ratio between the rate of change of the correcting signal Vd and the rate of change of the diameter of the grinding wheel must be changed. Such ratio α can be expressed as follows;

$$\alpha = \frac{\frac{\Delta Vd}{\Delta Vd_0}}{\frac{\Delta D}{Do}} = \frac{Do}{Vd_0} \cdot \frac{dVd}{dD} = \frac{Do}{Vd_0} \cdot \frac{Kd}{Do}$$

$$= \frac{Kd}{Vd_0} = \frac{R_5}{R_4 + R_5} \cdot \frac{RV_2}{R_1 \cdot Vd_0} \cdot \frac{Do}{K_3} \cdot Ki \quad (10)$$

As is apparent from the equation (10), the replacement of a grinding wheel with another grinding wheel having different initial diameter Do would change the ratio α. However, such difference can be easily corrected through a simple rearrangement of the grinding wheel initial diameter function circuit 10 in which the potentiometer $RV_3$ is so arranged as to have the divided ratio $K_3$ to change proportionally with respect to the different initial diameter Do of the grinding wheel. Such arrangement is obtained by adjusting the potentiometer $RV_3$ to satisfy the following equation;

$$, K_3 = Do/Dm$$

wherein Dm is a maximum diameter of the grinding wheel available to mount on the shaft of the honing machine. Accordingly, the ratio α given by the equation (10) can be converted into an equation as follows;

$$\alpha = \frac{R_4}{R_4 + R_5} \cdot \frac{RV_2 \cdot Dm}{R_1 \cdot Vd_0} \cdot Ki \quad (10a)$$

in which the ratio α is seen to be established irrespective of the value of the initial diameter Do of the grinding wheel.

Figure 4:
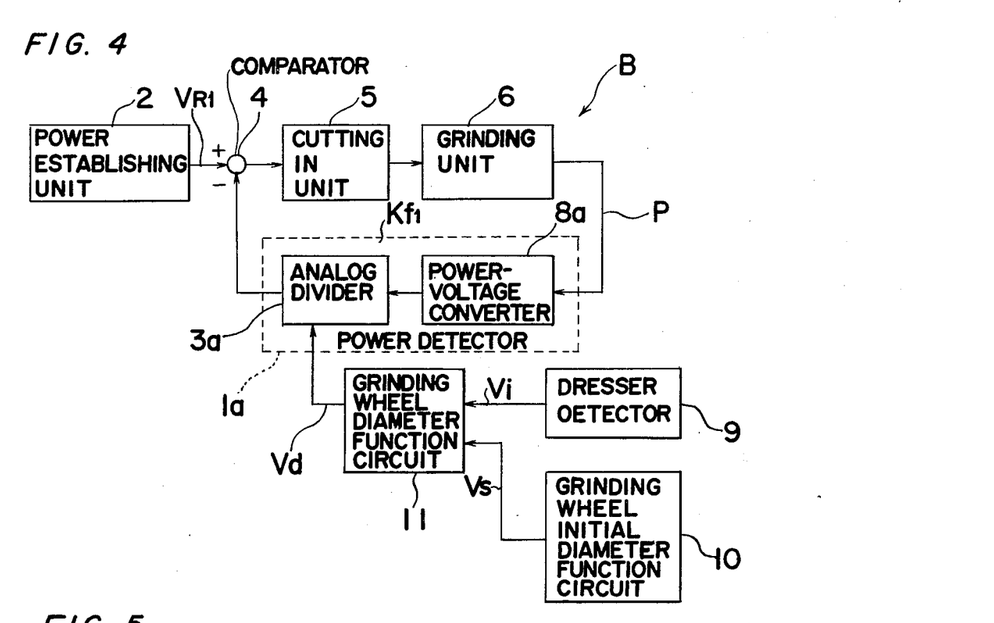
FIGS. 4 and 5 are similar views to FIG. 2, but particularly showing modifications thereof.

Referring to FIG. 4, there is shown a block diagram of a second embodiment of a power control circuit B of the present invention. The difference between the power control circuits A and B is that the power control circuit A has the analog multiplier 3 connected between the power establishing unit 2 and the comparator 4, while the power control circuit B has an analog divider 3a connected between the comparator 4 and the power voltage converter 8a for correcting the converting coefficient $Kf_1$ instead of correcting the coefficient $Kr_1$. It is to be noted that the analog divider 3a forms a power detector 1a together with the power-voltage converter 8a and that the analog divider 3a is also connected to the grinding wheel diameter function circuit 11 which produces the correction signal Vd towards the analog divider 3a upon receipt of signals from the dresser detector 9 and the grinding wheel initial diameter function circuit 10.

When defining the various factors as follows;
$VR_1$ — output signal from the power establishing unit 2
$Kf_{10}$ — initial converting coefficient
$Vd_0$ — initial correcting signal the consuming power P in the grinding unit 6 can be expressed as follows;

$$P \approx \frac{VR_1}{Kf_1} = \frac{VR_1}{Kf_{10} \cdot \frac{Vd_0}{Vd}} = \frac{VR_1}{Kf_{10} \cdot Vd_0} \cdot Vd \quad (11)$$

As is apparent from the equation 11, the consuming power P is in proportional to the correcting signal Vd. Furthermore, the correcting signal Vd given by the equation (9) shows that the value of the correcting signal Vd changes with respect to the change of the rate of change of the grinding wheel diameter D/Do. Accordingly, the resistance force Ft in this second embodiment can be corrected with respect to the rate of change of the grinding wheel diameter in a similar manner to the first embodiment described before in connection with FIG. 1.

Figure 5:
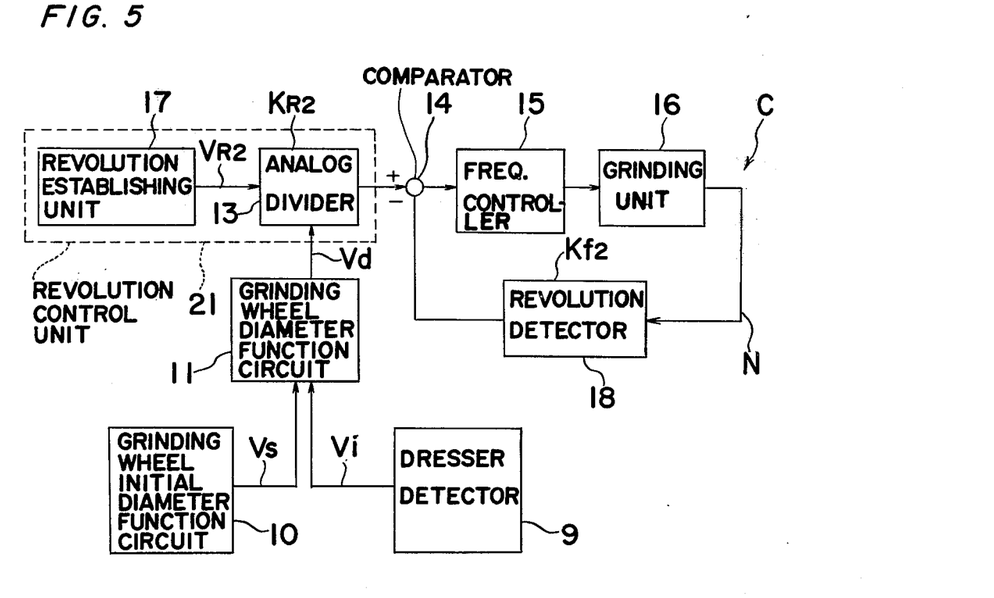

Referring to FIG. 5, there is shown a block diagram of a third embodiment of a power control circuit C of the present invention. The power control circuit C comprises a revolution control unit 21 having a revolution establishing unit 17 and an analog divider 13 which is connected to the revolution establishing unit 17 in series relation. The revolution establishing unit 17 is provided for establishing a voltage signal $VR_2$ indicative of predetermined number of revolution N of the grinding wheel driving motor 122, while the analog divider 13 is provided for dividing the voltage signal $VR_2$ by $1/KR_2$, which factor $KR_2$ serves as a variable coefficient. Connected to the analog divider 13 is a frequency controller 15 through the comparator 14 for controlling the frequency of the A.C. power to be supplied to the high frequency grinding motor coupled to the grinding unit 16 which is connected to the frequency controller 15. Connected to the grinding unit 16 is a revolution detector 18 which detects the revolution number N of the grinding wheel driving motor 122 so as to obtain a power consumed in the driving motor, and produces a voltage signal converted from the detected revolution number N with a converting coefficient of $Kf_2$. Other circuits such as grinding wheel diameter function circuit 11, dresser detector 9 and grinding wheel initial diameter function circuit 10 are exactly the same to those explained in the first embodiment, therefore, the explanation therefore is omitted for brevity.

According to the power control circuit C of the present invention, the revolution number N can be expressed as in following equation;

$$N \approx \frac{VR_2 \cdot KR_2}{Kf_2} = \frac{VR_2 \cdot KR_{20}}{Kf_2} \cdot \frac{Vd_0}{Vd} \qquad (12)$$

wherein $Vd$ is a value of correcting signal, $Vd_0$ is an initial value of the correcting signal and $KR_{20}$ is an initial value of the variable coefficient $KR_2$. As is apparent from the equation (1) and the equation (12), the resistance force $Ft$ is in reciprocal relation to the grinding wheel diameter D as well as to the revolution number N, while the revolution number N is in reciprocal relation to the value of the correcting signal $Vd$. Accordingly, by incessantly increasing the revolution number N, through the decrease of the correcting signal $Vd$, as the grinding wheel diameter D decrease, it is possible to prevent the resistance force $Ft$ to increase undesirably.

It should be noted that the revolution detector 18 described as provided for detecting the revolution number N of the high frequency grinding motor can be replaced by a frequency detector for detecting the frequency of the power to be supplied to the high frequency grinding motor.

It should further be noted that the high frequency grinding motor can be replaced by any ordinary driving motor with any known transmission system such as an endless belt passed around the axis of the driving motor and the shaft for the grinding wheel. In this case, it is necessary to replace the frequency controller 15 with a driving motor speed controller, while the revolution detector 18 may be so arranged as to detect the revolution number N' of the shaft of the grinding wheel instead of the revolution number N of the driving motor.

It should further be noted that the correction signal $Vd$ described as continuously produced from the grinding wheel diameter function circuit 11 can be rearranged to be produced step by step for intermittently correcting the variable reference signal.

As is fully described above, the power control circuit of the present invention includes the dresser detector 9 which is provided for detecting the rate of change of diameter of the grinding wheel by means of continuous detector such as potentiometer or the like element coupled to the dressing unit 124, the grinding wheel initial diameter function circuit 10 which is provided for detecting the initial diameter of the grinding wheel, and the grinding wheel diameter function circuit 11 which is provided for producing correcting signal, upon receipt of signals from the dresser detector 9 and the grinding wheel initial diameter function circuit 10, towards the revolution control unit or to the power detector for correcting the power to be supplied to the grinding unit. According to the present invention, the resistance force $Ft$ in a tangential direction of the grinding wheel with respect to the work piece can be constantly corrected to avoid the undesirable increase of the resistance force $Ft$ during the decrease of the diameter of the grinding wheel and can be controlled to maintain the desirable resistance force $Ft$. Such correction is carried out, in the first embodiment, by the analog multiplier which multiplies the voltage signal $VR_1$ by the correcting signal to form the variable signal produced from the analog multiplier in the optimum value or, in the second embodiment, by the analog divider which increases the converting coefficient of the power-voltage converter, or in the third embodiment, by increasing the revolution number of the shaft for the grinding wheel.

The power control circuit of the present invention not only maintains the resistance force $Ft$ at the optimum value, but also controls the resistance force $Ft$ to increase or to decrease at an optimum rate by the rearrangement of the values of the various elements in the grinding wheel diameter function circuit to produce different correcting signal $Vd$ therefrom. Accordingly, the resistance force $Ft$, which undesirably increases with respect to the decrease of the diameter of the grinding wheel, can be correcred by the power control circuit of the present invention to maintain the resistance force $Ft$ in a desired value or to have desired rate of change. Thus, it is possible to avoid the undesirable expansion of the hone to be formed in the work piece and to reduce the surface roughness of the work piece. In addition, it is possible to have a stable operation of the grinding wheel to obtain a smooth finish with high accuracy. Furthermore, the power control circuit of the present invention can be formed with small numbers of electrical elements with simple structure.

Although the present invention has been fully described by way of examples of the preferred embodiments, it is to be noted that various changes and modifications are apparent to those skilled in the art without departing the scope thereof. Accordingly, the present invention is not to be limited by the embodiments, but such changes and modifications should be construed as included within the scope thereof unless otherwise departing therefrom.

I claim:

1. A honing machine for grinding and polishing a work piece by a grinding wheel slidingly passing along a surface of the work piece to be worked on, said grinding wheel being connected to a grinding wheel driving motor and being sharpened, after predetermined number of grinding operations, through dressing, said honing machine comprising;
    (a) a grinding unit including the grinding wheel for carrying out a grinding operation;
    (b) the grinding wheel driving motor connected to said grinding wheel;
    (c) power adjusting means including power establishing means for establishing a power necessary to run the grinding unit and for producing a first signal indicative of said established power and power detecting means for detecting power consumed in the grinding wheel driving motor and for producing a second signal indicative of the detected power;
(d) a comparator for comparing said first signal with said second signal and for producing a third signal to be fed to grinding unit; and
(e) correcting means including diameter detecting means for detecting a degree of change of the grinding wheel diameter and for producing a fourth signal indicative of the detected value, initial diameter setting means for setting the initial diameter of the grinding wheel and for producing a fifth signal indicative of the initial diameter of the grinding wheel and calculation means for calculating, upon receipt of said fourth and fifth signals, a correction value which is in relation to a rate of change of grinding wheel diameter and for producing a correcting signal indicative of the calculated correction value, said correcting signal being provided to said power adjusting means for varying said third signal for controlling said power to be consumed in said grinding unit.

2. A honing machine as claimed in claim 1, wherein said calculation means comprises a first operational amplifier which receives said fourth signal at input thereof and provides an output signal therefrom to said initial diameter setting means and a second operational amplifier which receives said fifth signal at input thereof and provides an output signal therefrom to input of said first operational amplifier, thereby said correcting signal being produced from said output of said first operational amplifier.

3. A honing machine as claimed in claim 1, further comprising a cutting in unit which receives said third signal.

4. A honing machine as claimed in claim 1, wherein said diameter detecting means is a potentiometer incorporated in a dressing unit for effecting said dressing.

5. A honing machine as claimed in claim 1, wherein said power detecting means detects the power by a number of revolutions of said grinding wheel driving motor.

6. A honing machine as claimed in claim 1, wherein said power detecting means detects the power by an electric power consumed in said grinding wheel driving motor.

7. A honing machine as claimed in claim 1, wherein said power to be consumed in said grinding unit is controlled to be maintained in a predetermined value.

8. A honing machine as claimed in claim 1, wherein said power to be consumed in said grinding unit is controlled to be increased in a predetermined rate.

9. A honing machine as claimed in claim 1, wherein said power to be consumed in said grinding unit is controlled to be decreased in a predetermined rate.

10. A honing machine as claimed in claim 1, wherein said correcting signal is applied to said power establishing means.

11. A honing machine as claimed in claim 10, wherein said power establishing means comprising a power establishing unit where a fixed predetermined power is established and an analog multiplier connected to said power establishing unit for producing said first signal upon receipt of said correcting signal.

12. A honing machine as claimed in claim 1, wherein said correcting signal is applied to said power detecting means.

13. A honing machine as claimed in claim 12, wherein said power detecting means comprises a converting means for converting the detected power consumed in the grinding wheel driving motor into voltage signal and an analog divider connected to said converting means for producing said second signal upon receipt of said correcting signal.

14. A honing machine for grinding and polishing a work piece by a grinding wheel slidingly passing along a surface of the work piece to be worked on, said grinding wheel being connected to a grinding wheel driving motor, said honing machine comprising;
(a) power establishing means for establishing a power;
(b) a grinding unit for carrying out a grinding operation upon receipt of established power from said power establishing means;
(c) the grinding wheel driving motor connected to said grinding wheel;
(d) power detecting means for detecting power consumed in said grinding wheel driving motor;
(e) a comparator for comparing an output signal from said power establishing means with an output power from said power detecting means and for producing a signal to be fed to said grinding unit;
(f) diameter detecting means for detecting a degree of change of the grinding wheel diameter;
(g) initial diameter setting means for setting the initial diameter of the grinding wheel; and
(h) a calculation means for calculating, upon receipt of signals from said diameter detecting means and initial diameter setting means, a correction value which is in relation to a rate of change of grinding wheel diameter and for producing a correcting signal indicative of the calculated correction value, said correcting signal being provided to either one of said power establishing means and said power detecting means so as to correct either one of a signal produced from said power establishing means, a signal produced from said power detecting means and a signal for controlling revolution number of said grinding wheel driving motor, thereby controlling the power to be consumed in said grinding unit in a predetermined value.

* * * * *